(12) United States Patent
Glynn et al.

(10) Patent No.: US 7,331,489 B2
(45) Date of Patent: Feb. 19, 2008

(54) METERED DOSE SQUEEZE DISPENSER HAVING A DIP TUBE WITH A ROTATABLE LEG

(75) Inventors: Kenneth P. Glynn, Flemington, NJ (US); Stuart W. DeJonge, Lake Ariel, PA (US)

(73) Assignee: GlynnTech, Inc., Flemington, NJ (US)

( * ) Notice: Subject to any disclaimer, the term of this patent is extended or adjusted under 35 U.S.C. 154(b) by 272 days.

(21) Appl. No.: 11/251,420

(22) Filed: Oct. 14, 2005

(65) Prior Publication Data

US 2007/0205224 A1   Sep. 6, 2007

Related U.S. Application Data

(63) Continuation-in-part of application No. 10/993,764, filed on Nov. 19, 2004, now abandoned.

(51) Int. Cl.
*B65D 37/00* (2006.01)
(52) U.S. Cl. .............. 222/211; 222/205; 222/207; 222/456; 222/464.4; 222/464.6
(58) Field of Classification Search ............ 222/464.1, 222/464.3, 464.4, 464.6, 205–207, 209, 211, 222/212, 213, 435, 454, 456
See application file for complete search history.

(56) References Cited

U.S. PATENT DOCUMENTS

| | | | | |
|---|---|---|---|---|
| 56,004 | A | * | 7/1866 | Capewell ................. 222/211 |
| 152,332 | A | * | 6/1874 | Chamberlain ............. 222/211 |
| 1,735,784 | A | * | 11/1929 | Olson ..................... 222/211 |
| 2,483,661 | A | * | 10/1949 | Neas ........................ 222/4 |
| 2,730,270 | A | | 1/1956 | Heinemann |
| 2,942,762 | A | | 6/1960 | Fahr |
| 2,979,236 | A | | 4/1961 | Fahr |
| 2,986,310 | A | * | 5/1961 | Spaulding ............... 222/481.5 |
| 2,989,216 | A | | 6/1961 | Moro-Lin |
| 3,203,454 | A | | 8/1965 | Micallef |
| 3,347,420 | A | | 10/1967 | Donoghue |
| 3,628,700 | A | | 12/1971 | Donoghue |
| 3,663,113 | A | | 5/1972 | Frain et al. |
| 3,878,972 | A | | 4/1975 | Por |
| 4,077,547 | A | | 3/1978 | Donoghue |
| 4,162,749 | A | | 7/1979 | Bennett |
| 4,190,180 | A | | 2/1980 | Bennett |
| 4,211,346 | A | | 7/1980 | Mehra et al. |
| 4,541,552 | A | | 9/1985 | Sheithauer |

(Continued)

FOREIGN PATENT DOCUMENTS

DE     1075967     2/1960

(Continued)

*Primary Examiner*—J. Casimer Jacyna
(74) *Attorney, Agent, or Firm*—Kenneth P. Glynn, Esq (57) ABSTRACT

A liquid metered dispensing squeeze bottle includes: (a.) a squeezable container having an opening for dispensing liquid therefrom at one end and a bottom at the other end; (b.) a nonflexible trap chamber of a predetermined volume, connected to the opening of the container; (c.) a dip tube, and (d.) a one way valve at the bottom of the dip tube. There is an inlet leg that freely rotates around the bottom of the dip tube and a drive mechanism, such as a counterweight or a float, to assure that the leg extends into an air pocket when the container is tilted for liquid squeeze dispensing.

20 Claims, 5 Drawing Sheets

U.S. PATENT DOCUMENTS

| | | |
|---|---|---|
| 4,625,897 A | 12/1986 | Wortley |
| 4,779,767 A | 10/1988 | Griffiths |
| 4,830,235 A * | 5/1989 | Miller ............... 222/464.4 |
| 4,940,152 A * | 7/1990 | Lin ..................... 215/11.5 |
| 5,127,552 A | 7/1992 | Weinstein |
| 5,199,808 A | 4/1993 | Gueret |
| 5,568,990 A | 10/1996 | McAuley |
| 5,657,909 A * | 8/1997 | Barriac ................. 222/382 |
| 5,899,624 A | 5/1999 | Thompson |
| 6,332,564 B2 * | 12/2001 | Ichikawa ............. 222/464.1 |
| 6,758,620 B1 | 7/2004 | Harrold |
| 2007/0080180 A1 * | 4/2007 | Ceccarelli et al. ......... 222/456 |

FOREIGN PATENT DOCUMENTS

| | | |
|---|---|---|
| DE | 3819-098 A | 1/1989 |
| EP | 383-644 A | 8/1990 |
| NL | 7613-833 | 6/1978 |
| NL | 7712-828 | 5/1979 |
| PK | 110059 | 8/1960 |

* cited by examiner

METERED DOSE SQUEEZE DISPENSER HAVING A DIP TUBE WITH A ROTATABLE LEG

REFERENCE TO RELATED APPLICATIONS

This application is a continuation-in-part of U.S. Utility patent application Ser. No. 10/993,764, entitled "METERED DOSE SQUEEZE DISPENSER" and filed on Nov. 19, 2004 now abandoned by the same inventors herein.

BACKGROUND OF THE INVENTION

1. Field of the Invention

The present invention relates to squeeze dispensers for metered dose dispensing of a liquid, such as vitamins, medications, four stroke motor oil, etc. The present invention dispensers rely upon a unique combination of trap chamber, dip tube and valving at the bottom of the dip tube.

2. Information Disclosure Statement

The following prior art is representative of the state of the art in the field of metered dispensing:

U.S. Pat. No. 2,730,270 describes a combination liquid measuring and dispensing device comprising in combination with a compressible container, a liquid flow conduit in said container and extending through the uppermost end of the latter; an elongated measuring tube having the lowermost end thereof disposed adjacent said uppermost end of the container exteriorly of the latter; and a laterally-extending pouring spout integral with the tube at the uppermost end thereof and provided with a restricted outlet orifice, said conduit extending into the tube through said lowermost end and on the longitudinal axis of the latter and being joined to said lowermost end of the tube in closing relationship thereto, a portion of the conduit within the tube extending at an angle in a direction oppositely to the pouring spout and terminating in an uppermost open end spaced from the pouring spout on one side of said longitudinal axis of the tube whereby, when the container is grasped and tilted to pour the contents of the tube through said orifice, said contents will not flow into the container through the conduit, a portion of the conduit within the container extending at an angle in the direction of the pouring spout, whereby to prevent flow of liquid from the container into the tube during the aforementioned pouring operation.

U.S. Pat. No. 2,942,762 describes a dispenser for attachment to a primary reservoir having a threaded top comprising, in combination, a flexible cap characterized by a convex circular top and generally cylindrical side wall portions defining an internal cap reservoir, intersecting slits in the top of the cap defining flaps, a reinforcing ring integral with the cap top and ringing the flap bases, an internal mounting shoulder at the base of the cap side walls, a check valve housing with an upper ring to engage the cap mounting shoulder, a threaded coupler defining a flexible cap receiving opening at its top, a cap lock ring within the coupler which cooperates with the check valve housing against upward movement relative to the coupler, and a delivery tube extending into the primary reservoir from the check valve housing which delivers the contents of the primary reservoir into the cap reservoir and through the discharge flaps responsive to the pumping action effected by flexing the cap top.

U.S. Pat. No. 2,979,236 describes a dispenser unit for attachment to a container for dispensing the contents thereof comprising a cap having a tapered portion for insertion within an opening of said container, said cap having portions external of said container consisting of interconnected front and rear walls and a top wall, said front wall being greater in height than said rear wall, the top wall of said cap extending from the upper edge of said front wall to the rear wall at an angle to the plane of the opening in said container, a protuberance from said front wall, said protuberance having a slit therein, said slit forming a valve for extruding the contents of said container, and a ball in said tapered portion forming a valve in series with said slit valve, said tapered portion, said front and rear walls, said top wall and said protuberance being integral and resilient.

U.S. Pat. No. 2,989,216 describes a portion dispensing container for liquid comprising a squeeze container having a flexible wall, a bottom, and a top having a reservoir section, a movable funnel-shaped measuring cup having an outlet tip serving as the sole draining outlet for said cup, said cup being disposed within said container in a manner so that its sides ride vertically adjacent the sides of said reservoir section and its upper edge is abuttable against the top of said reservoir section, a separate ridge tube connectable at one end to said outlet tip and other end penetrating the bottom of said container in sealing relation therewith to allow discharge therethrough of said liquid when said container is inverted to fill said cup, then uprighted, and the wall is squeezed.

U.S. Pat. No. 3,203,454 describes a measuring cup for pressurized containers having a downwardly movable discharge valve operating member in an end wall, a tubular sleeve extending downwardly from the bottom wall of said cup, the bottom end of said sleeve being shaped to engage said member and surround the discharge opening of said container, said tubular sleeve extending above the bottom of said cup, discharge passages in the wall of said sleeve adjacent the inner face of the bottom wall of said cup, a closure for the end of said sleeve, said closure having a flange extending substantially beyond the wall of said sleeve and having at its outer edge an unbroken flat surface contacting the bottom wall of said cup and an annular groove within said flat surface, the discharge passages in said sleeve opening into said groove.

U.S. Pat. No. 3,347,420 describes a container for dispensing measured quantities of different liquids and comprising an integral multi-compartment body formed of flexible wall light-transmitting molded material, two of the said compartments being reservoirs formed with a common generally vertical web, at least one other compartment defining a measuring and dispensing chamber formed over the reservoir compartments and having a common generally horizontal separating wall therewith which is provided with an opening on each side of the vertical separating wall to provide communication with the respective reservoirs, the said horizontal separating wall being deeply grooved on opposite sides to connect the two reservoirs to the measuring and dispensing compartment by a generally horizontal web, the said measuring and dispensing compartment being formed with a top wall having a dispensing opening adapted to be closed by a cap and providing access to the openings in the horizontal separating wall for filling the reservoirs, a conduit means for opening in the horizontal separating wall and insertable therein through the dispensing opening, said conduit means including an opening at its upper end whereby liquid can be transferred independently from the reservoirs and in quantities determined by observing the liquid level in said chamber through the light-transmitting material and in total quantity determined by the liquid level at the discharge openings of said pouring spouts, the transferred liquid being thereafter dispensed from the measuring and dispensing chamber.

U.S. Pat. No. 3,628,700 describes a container and closure assembly that has a resilient lower storage chamber and a transparent upper dispensing chamber defined either in one unitary body, or in two units in a fitment between the chambers serves to transfer a predetermined quantity of liquid from the lower to the upper chamber upon squeezing the lower one. The upper portion of the dispensing and measuring chamber has discharge orifices defined therein, or in an insert provided in a top opening thereof. The insert may comprise either an orifice pattern, an atomizing spray nozzle, or a foam nozzle and may be capped off by a conventional cap.

U.S. Pat. No. 3,663,113 describes a fluid applicator assembly including a retainer ring adapted to be snugly fitted within the open end of a container, the ring having at one end an inwardly extending peripheral web member having a valve opening therein, a valve stem extending through the valve opening and having an abutment at one end lying against a cover means for the assembly and a valve head at its other end lying against the underside of the web, and a coil spring urging the valve stem in a forward direction, the wall of the web opening being inclined forwardly so as to define a valve seat and the wall of the web opening being further inclined inwardly so as to permit easy snap-in insertion of the valve stem through the opening.

U.S. Pat. No. 3,878,972 describes an apparatus for measuring and dispensing liquids that includes a flexible container which is squeezable operated to increase the pressure therein and thereby operate a fluid control valve mounted in a filler tube for discharge a quantity of fluid into a measuring receptacle mounted on the container, whereupon the decrease in pressure within the container caused by the discharge of fluid therefrom operates to open an air inlet valve allowing air to enter the container when the container is released.

U.S. Pat. No. 4,077,547 describes a measuring and dispensing apparatus for use with a flexible-wall container. It includes a dispensing means having an enlarged cylindrical base portion having an upper end and a lower end, the lower end disposed on the enlarged base portion, the upstanding portion also having a bore therein and an outlet orifice disposed therein proximate the upper end and in fluid communication with the bore; the enlarged base portion having container engaging means thereon; wall means disposed around the dispensing means and forming, with the enlarged base portion a fluid measuring chamber, the chamber having an upper end having a fluid outlet; and a tube having an inlet end and an outlet end, the tube disposed so that the outlet end is disposed in the bore in the upstanding portion of the dispensing means and in fluid communication therewith, the inlet end adapted to be disposed in the flexible-wall container.

U.S. Pat. No. 4,162,749 describes a disposable squeezable dispenser employing a flexible container filled with a mixture of air and the liquid to be dispensed. The dispenser employes only two main parts (other than the container itself) plus a ball and dip tub. One of the main part is a hollow pull top which cooperates with the other main part in a sealing operation which prevents leakage when the dispenser is not in use.

U.S. Pat. No. 4,190,180 describes the open neck of a vertical container of fluid that is covered by a horizontal flexible diaphragm with an outer lip detachably engaging the periphery of the neck. A top disposed concave cup-like recess centrally disposed in the diaphragm has a hole in the bottom. A vertically elongated tube open at both ends extends through the hole and is sealed thereto, these ends being interconnected by a vertical bore. The bottom end extends into the fluid. The bore has a vertically elongated enlarged region which is disposed intermediate the top and bottom tube ends. The top tube end has a plurality of horizontal spaced conduits interconnecting the bore with the interior of the recess. A sphere in said region is slidable up and down therein, being moved by gravity to the bottom of the region when the tube is upright and being moved by gravity at the top of the region when the tube is inverted. Two sealing devices are disposed in the region adjacent the top and bottom thereof respectively. The sphere when disposed in the top of the region engages the first device and when disposed in the bottom of the region engages the second device, each device when engaged by said sphere forming a closed neck valve through which said liquid cannot pass.

U.S. Pat. No. 4,211,346 describes a variable volume dispenser of the type wherein squeezing a manually deformable bottle forces liquid from the bottle up through a dispenser tube and into a measuring chamber. An axially movable closure, captured within the outlet end of the dispenser tube is pushed or pulled to snap open or snap close the outlet end.

U.S. Pat. No. 4,541,552 describes a device for metering and dispensing liquid or semiliquid mediums, such as adhesives, paints, lacquers, oils, and anaerobic plastics, comprising a tube having a discharge port and a first valve seat with a conical taper thereto inside of the tube adjacent the discharge port, and a valve body slidable within the tube between open and closed positions with the first valve seat. The valve body has a conical tapered end portion which complements the conical taper of the first valve seat of the tube. At least one spring normally biases the valve body to closed position against the first valve body which extends through the discharge port of the tube and closes it when the valve body is in closed position against the first valve seat. A cylindrical inner wall of the tube to form a second valve seat between the flared storage chamber and a metering chamber formed between the ends of the valve body with the cylindrical inner wall of the tube for the purpose of controlling the amount of medium dispensed during use of the device.

U.S. Pat. No. 4,625,897 describes a metering dispenser assembly having a squeeze bottle with a metering cup fitting the neck of the bottle and carrying a dip tube which extends to the bottom of the bottle. The dip tube, or at least a pillar into which it fits, terminates at a level between the top and bottom of the cup, and there is a vent hole at this level to provide communication between the container and atmosphere. The vent is small enough not to allow significant leakage from the cup during a dispensing operation. The vent could instead be alongside the dip tube.

U.S. Pat. No. 4,779,767 describes a pre-measure dispensing device that is made of translucent plastic material adapted to be screwed onto the top of a bottle to pre-measure fluid dispensed from said bottle. The bottle may be deformable so that when squeezed, fluid goes up the tube into the measuring device. The bottle can then be tipped to expel the exact amount of the fluid desired.

U.S. Pat. No. 5,127,553 describes a liquid metered dispensing container of the squeezable type. The squeezable container has an opening for dispensing liquid therefrom at one end and a bottom at the other end. A non-flexible trap chamber is connected to the opening and extends outwardly therefrom. The trap chamber has a lower end inserted into the container opening and has an inlet orifice extending from the lower end into the container. The inlet orifice is adapted to receive a dip tube which is attached thereto and extends close to or at the bottom of the container. The trap chamber has an upper end with a dispensing orifice. This is small enough to prevent dripping of liquid therefrom by gravity when the bottle is inverted but is large enough to dispense liquid therefrom when the bottle itself is squeezed. A one way valve is connected to the lower end of the trap chamber which permits liquid to flow from the container to the trap chamber but not vice versa. The trap chamber may have indicia so that the exact dosage levels of different amounts may be squeezed into the chamber, or the chamber itself may have a single, predetermined volume.

U.S. Pat. No. 5,199,808 describes an applicator device comprising a receptacle, which is closed by a tearable cover, and a deformable applicator element, in which, between the applicator element and the cover, is a round body retained by a retaining device. Under the effect of pressure exerted on the applicator element, which is transmitted to the rounded body, said rounded body tears the cover and falls into the receptacle.

U.S. Pat. No. 5,568,990 describes a liquid applicator with a self-sealing feature. The applicator includes a housing, a valve member and a spring member. The housing has an aperture through its top wall and an annular sleeve projecting inwardly from an edge of annular sleeve having an end portion. The valve member includes an actuating part that is slideably received by the annular sleeve and a sealing part that is shaped to form a releasable seal with the end portion of the annular sleeve. The valve and spring members are disposed in an axially displaceable relation such that the actuating part of the valve member is resiliently urged into the annular sleeve; that a part of the actuating part protrudes from the top wall of the housing; and that the sealing part of the valve member sealably engages with the end portion of the annular sleeve.

U.S. Pat. No. 5,899,624 describes a fluid dispensing valve used for printing and marking, having a valve body with an end wall which defines an aperture and a spring biased valve element disposed within the valve body to open and close the aperture. A spring element is coupled to the tubular body adjacent the circular wall, the spring element and the wall defining a chamber for receiving a fluid metered through the aperture of the valve body when the aperture is opened, the spring element having at least one aperture communicating with the chamber. A porous member transfers the fluid received in the chamber to a surface in the form of a printed geometric image. In operation, a printing force applied to the porous member causes the spring element to compress and engage the portion of the valve element thereby pushing a portion of the valve element partially back through the aperture in the open position to allow the passage of a marking fluid therethrough to the chamber to wet the porous member. The porous member has a predetermined rigidity which substantially prevents the porous member from distorting from its predetermined geometric shape under the printing force. The fluid dispensing valve is typically affixed to the open end of a container which contains the fluid to be dispensed. A removable cap is provided for covering the valve when it is not being used.

U.S. Pat. No. 6,758,620 B1 describes a metered dose dispensing dabber device that includes a dabber main housing having a container attachment for affixing the device to a container, a metered dosage reservoir, a hollow dip tube, a metered dosage reservoir outlet, and a valve. The main housing has a base divider wall, this base divider wall having an underside and top side. Further, the base divider wall is closed to prevent liquid from passing from the underside to the top side. The metered dosage reservoir has enclosed walls and is located above the top side of the divider wall. The hollow dip tube passes through the base divider wall and extends downwardly therefrom for insertion into a container. The dip tube also extends upwardly to a predetermined height in the metered dosage reservoir to establish a fill level. The metered dosage reservoir outlet is located on a metered dosage reservoir wall opposite the dip tube. The valve is located in the reservoir outlet, in proximity to the dip tube. The valve has a first position wherein the reservoir outlet is closed and the dip tube is open, and has a second position wherein the reservoir outlet is open and the dip tube closed. The device is attached to a container. A user squeezes a container to fill the reservoir (dab) the metered dosage.

Pakistan Patent No. 110,059 describes a collapsible container comprising a dispensing chamber including a measuring cup, a tube leading from near one end of the container and projecting into the measuring cup, a tube leading from near one end of the container and projecting into the measuring cup so that liquid is forced through the tube and into the chamber when the container is collapsed, the size of the measuring cup and the position of a discharge opening or openings in the projecting part of the tube determining a measured quantity of liquid to be dispensed from the container, and an outlet through which liquid can be discharged from the chamber. The invention is particularly applicable to containers for hair treatment liquids, but the containers can obviously be used for other liquids which need to be dispensed in measured quantities.

Netherlands Patent No. 7,613,833 describes a liquid metering device that is intended for a bottle and comprises a stopper fitting in or on the bottle opening and containing a chamber with bottom and side walls and an outlet. A tube enters the chamber and is connected, at its lower end, to a rigid tube or hose extending to near the bottom of the bottle. The tube orifice is at a predetermined level above the chamber bottom and below the outlet which is a narrow jet orifice. The volume of the chamber is preferably at least twice the volume determined by the position of the tube orifice.

Netherlands Patent No. 7,712,828 describes a container made from a flexible material that is combined with a second container. They are used for tapping a fixed amount of liquid accurately. The two holders are interconnected via a tube. The second holder has a discharge hole surrounded by a neck with an external thread. The ends of the tube are located near the ends of the holders facing away from each other. The second holder is partially made from transparent material and has a scale division. The tube is fixed to the second holder. The hole is in the first holder.

Germany Patent No. 1,075,967 describes a dosing and transport bottle of a transparent and resilient synthetic material, having attached to the neck a transparent dosing container connected to the interior via a riser pipe.

Europe Patent No. 383,644 A1 describes a dispensing container that includes a liquid reservoir with a screw fitting cap. A dispensing chamber is defined within the space over which the cap fits. The volume of the chamber is variable, with the side walls of the chamber being formed of a bellows. The base of the bellows chamber includes an opening with a tube extending into the liquid. The tube also includes a non-return valve. The cap includes an inner protrusion, so that when fitted it depresses the bellows, and when removed, the bellows expand to fill the chamber with liquid.

Germany Patent No. 3,819,098 A1 describes a dosing chamber emptied by pouring that is connected to a liquid in a reservoir chamber with a flexible wall via a rising tube. The rising tube connects to a dosing shaft in the dosage chamber with a liquid aperture above the dosage chamber base. The dosage chamber is in the form of a beaker whose inner wall has a peripheral marking offset w.r.t. the bounding wall. The marking is visible by looking through the beaker opening into the beaker's interior. The marking may be in the form of an annular step in the beaker's wall.

Notwithstanding the prior art, the present invention is neither taught nor rendered obvious thereby.

SUMMARY OF THE INVENTION

The present invention relates to a liquid metered dispensing squeeze bottles. The bottles include: (a.) a squeezable container having an opening for dispensing liquid therefrom at one end and a bottom at the other end; (b.) a nonflexible trap chamber of a predetermined volume, connected to the opening of the container; (c.) a dip tube, and (d.) a one way valve system connected to the lower end of the dip tube which permits liquid to flow from the container into the dip tube but not from the dip tube to the container. The one way valve system includes a valve housing having at least one rotatable leg extending outwardly from the dip tube, and the at least one rotatable leg is rotatable relative to the dip tube. The at least one rotatable leg includes a drive mechanism so as to rotate the at least one leg of the dip tube in an upward direction away from liquid content of the container when the container has liquid content and is tilted for dispensing. The drive mechanism may be a counterweight, a float or both.

The trap chamber has a lower end which is inserted into the container opening and has an inlet orifice extending from the lower end and into the container.

The dip tube, the dip tube has an upper end extending from the inlet orifice and extending downwardly into the container, and has a lower end at or near the bottom of the container. The dip tube and all or part of the trap chamber may be unistructurally molded or may be assembled in parts.

The one way valve system is connected to the lower end of the dip tube and it permits liquid to flow from the container into the dip tube but not from the dip tube to the container.

In some embodiments, the trap chamber has indicia which indicate predetermined volume levels.

In some embodiments, to enhance assembly, the nonflexible trap chamber has either the male or female portion of a snap-in lock for permanent insertion into the opening of the container, and the container has the other of the male or female portion of the snap-in lock.

In some embodiments, the squeezable container contains a liquid for dispensing which fills the container to a predetermined level below the trap chamber to create an air space therebetween.

In some embodiments, the liquid metered dispensing bottle one way valve system has a ball valve with a ball stop contained within a tapered valve housing having an inlet orifice at its lowest area, and the ball stop is positioned to prevent the ball from contacting and blocking the dip tube from receiving air when the squeezable container is inverted and squeezed.

The liquid metered dispensing bottle trap chamber preferably has indicia which indicate predetermined volume levels.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

The present invention liquid metered dispensing bottle is one which may be operated in three simple steps. First, the user holds the squeezable container in its normal, upright position and squeezes the side walls so as to force liquid up a dip tube and into a trap chamber. A valve located at the bottom of the dip tube keeps the liquid that has been moved into the chamber from draining back into the container or significantly shows its draining into the container, i.e. a speed valve. The sum content remaining in the trap chamber and dip tube above the valve is the metered or premeasured dose. Second, the user merely inverts the container and the air pocket which now rises to the inverted bottom creates a buffer between the trap chamber liquid and the remaining liquid in the bottle. Third, the container is squeezed in this inverted position, and air is forced down the inlet leg and into the dip tube and forces out the metered amount of liquid.

The present invention bottle may involve any type of squeezable container and the trap chamber is generally non-flexible so as to not distort the predetermined volume thereof. In fact, given a dip tube of appropriate volume, in some embodiments, the dip tube itself may also be the trap chamber. Usually, however, they are different sections of the device. While not a critical feature of the present invention, the liquid metered dispensing bottle may include some type of lid or cover and this may be a pop-in, a flip top, a screw cap, a snap cap or any other type of closure which is known to the art. These would include, but not be limited to, childproof type closures, as the product may dictate.

Figure 1:
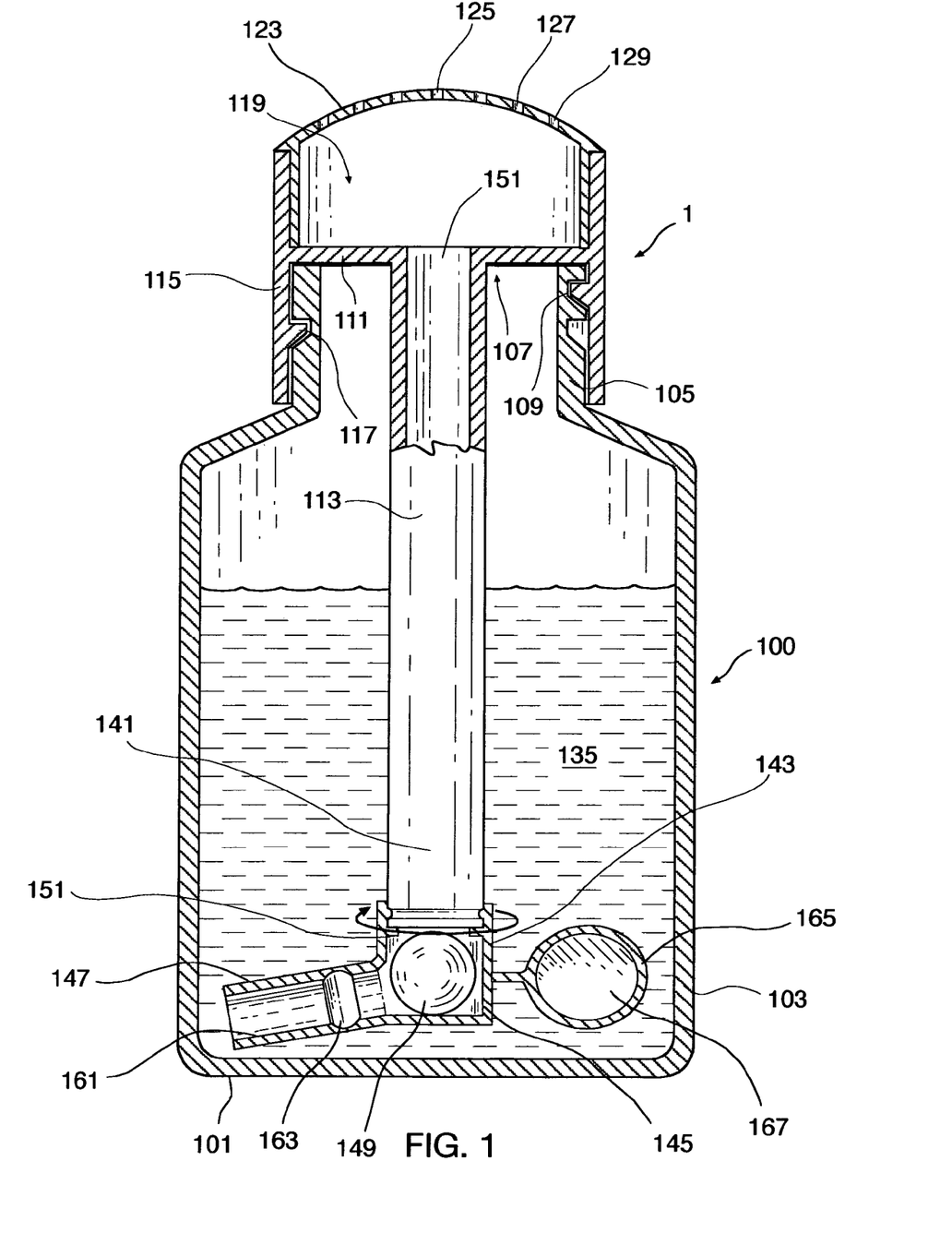
FIG. 1 shows a side cut view of one embodiment of a liquid metered dispensing squeeze bottle of the present invention with liquid contained therein.

Referring now to FIG. 1, there is shown squeezable container 100 which has a container sidewall 103, bottom 101, and a container neck 105. Container neck 105 has container opening 107 and also has container threads 109. These container threads 109 are optional in this case and could be snap fit or other attachment arrangement. Trap chamber 119 has a lower end 111 as shown, with inlet orifice 151, and, in this case, a curved top upper end 123. This upper end 123 has a plurality of dispensing (exit) orifices, such as orifice 125, 127 and 129. The dispensing orifices may be small enough to prevent dripping of liquid therefrom by gravity when the dispensing bottle is inverted but large enough to dispense liquid therefrom when the container is inverted and squeezed. The exact diameter of the orifice will be dictated by the viscosity of the liquid 45 contained in squeezable container 1, and this is well within the skill of the artisan. Also, a vacuum effect occurs in the container when inverted and not squeezed and this vacuum also helps to prevent dripping. An overcap (not shown) would be appropriate to prevent evaporation or leaking from accidental pressure.

Trap chamber 119 inlet orifice 151 extends into dip tube 113, as shown. Further, trap chamber 119 and dip tube 113 may be of a specific volume so as to meet a single or double dosage requirement, or it may be graded with indicia to indicate different predetermined or metered volumetric amounts. In many embodiments, fill lines with indicia such as the "3 cc" shown as indicia 31 may be used.

Trap chamber 113 may be integrally molded with dip tube 113, or they may be formed separately and connected to one another. Trap chamber 113 may be attached to a squeezable container 100 by any known mechanism and may be heat welded, glued, irreversibly screwed in, irreversibly snapped in, or the like. In its particular embodiment, threads 109 receive threads 117 of the cap-like extension 115 of trap chamber 119. A stop or thread lock could prevent or discourage unscrewing. In another embodiment, a snap lock female component is located on the inside of neck while a snap lock male component is located on the outside of trap chamber and the trap chamber is pushed into opening of the container so that the female component and the male component interlock.

At the bottom end 141 of dip tube 113 is a valve mechanism 143 with an inlet leg 147. Air inlet leg 147 has a base 145 and inlet orifice 161, as well as a valve ball 149. Air inlet leg 147 is mounted on dip tube 113 so that it is rotatable thereon, as shown by the arrow. There is a counterweight 167 that extends off leg 147 in a direction opposite orifice 161. Thus, when the container 100 is tilted, gravity causes counterweight 165 to drop downward in the liquid 135 and this drives the air inlet orifice 161 upwardly to the air pocket rather than to possibly remain submerged. This helps to prevent inadvertent over dispensing of liquid.

Valve ball 149 rests on base 145 and closes the inlet leg 147 as shown, when the container 100 is upright. While upright, the container is squeezed by a user and liquid will flow into the inlet leg 147, past the ball 149 and into the dip tube 113 and the trap chamber 119 until it fills the trap chamber or until the user reaches a predetermined level. The trap chamber may be transparent or translucent, and level marks, discussed above, may be included. Stops, such as stop 151 (e.g. a spider screen) would stop ball 149 from blocking upwardly when container 100 is squeezed.

The user would squeeze container 100 in its upright position to fill the top chamber 119 and dip tube 113 to get a dose of liquid 135. Then, the user would simply invert, wherein the counterweight maintains the air inlet orifice 161 upwardly in the air pocket. The use would simply squeeze again to force air into the dip tube and chamber to dispense the dose.

An optional thin area 163 acts as a flexion point so that leg 147 can be folded toward tube 113 for insertion into a narrow container neck opening.

Figure 2:
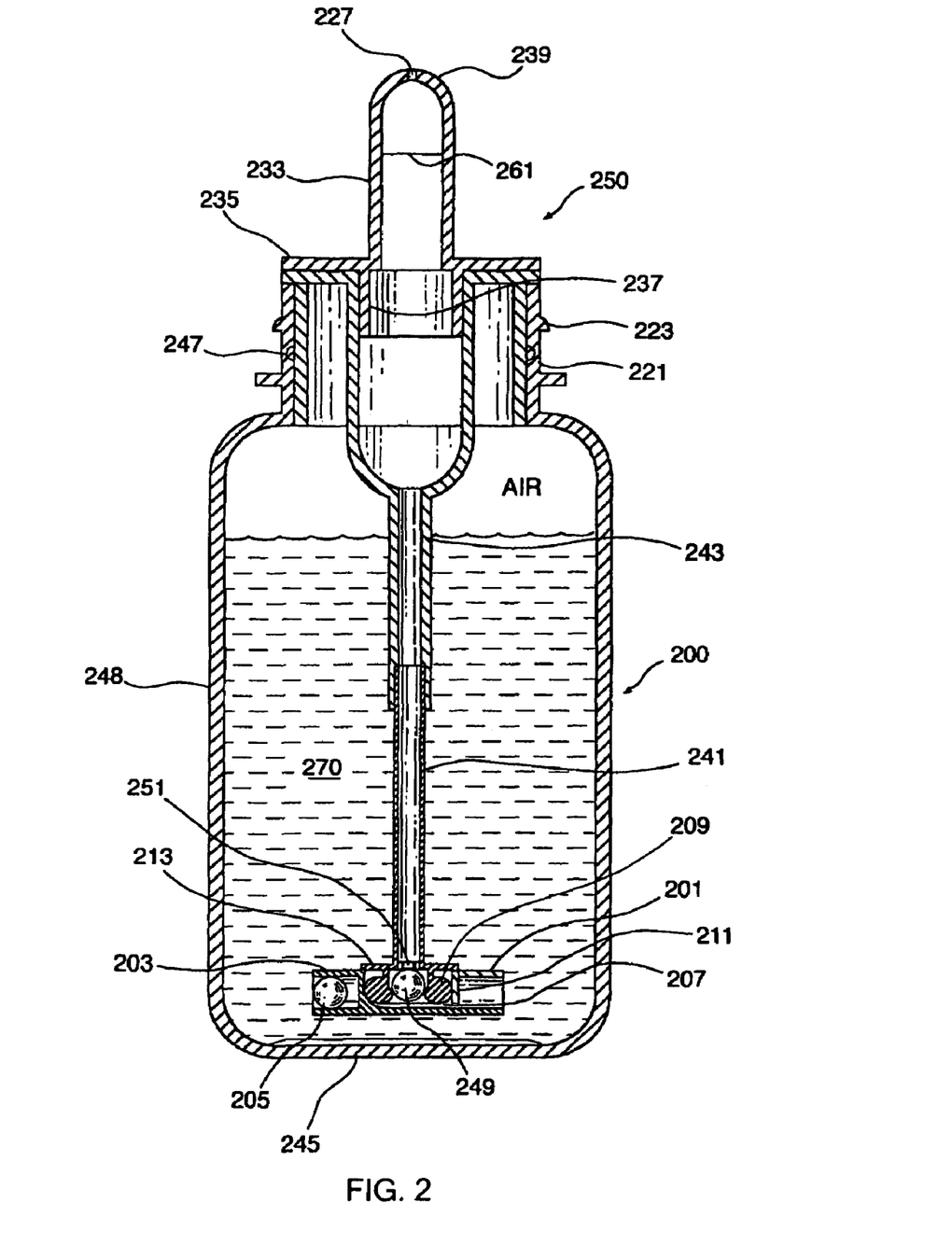
FIG. 2 shows a side cut view of another preferred embodiment of a liquid metered dispensing squeeze bottle of the present invention with liquid contained therein.

In FIG. 2, there is a preferred squeezable container 200 which has a container sidewall 243, bottom 245, and a container neck 221. Container neck 221 has a container opening, as shown, and also has container threads 223 for receiving a screw-on type overcap. Trap chamber 231 has a lower end down corner 243, as shown, that is connected to dip tube 241. At the upper end of trap chamber 231 is a dispensing nozzle 250 with a single dispensing (exit) orifice 227 at its top 239. The dispensing orifice 227 may be small enough to prevent dripping of liquid therefrom by gravity when the dispensing bottle is inverted but large enough to dispense liquid therefrom when the container is inverted and squeezed. The exact diameter of the orifice will be dictated by the viscosity of the liquid 270 contained in squeezable container 200, and this is well within the skill of the artisan. Lower extension 237 of nozzle 250 snap fits into trap chamber 231 and nozzle flange 235 rests atop the trap chamber 231. Likewise, trap chamber 231 force fits or snap locks into neck 221 of container 200.

Trap chamber 231 and dip tube 241 may be of a specific volume so as to meet a single or double dosage requirement, or it may be graded with indicia to indicate different predetermined or metered volumetric amounts. In many embodiments, level lines or fill lines, such as line 261, may be employed to set the dosage. Alternatively, a clear chamber and/or nozzle with instructions to visually confirm filling would also work for controlled dosage.

Although trap chamber 231 is snap locked into container 200, it may alternatively be attached to a squeezable container 200 by any known mechanism, e.g., it may be heat welded, glued, irreversibly screwed in, irreversibly snapped in, force fitted or the like. In this embodiment, a snap lock female component 247 is located on the inside of neck while a snap lock male component is located on the outside of trap chamber and the trap chamber is pushed into opening of the container so that the female component and the male component interlock.

At the bottom end 213 of dip tube 241 is a valve mechanism with an inlet leg 201. Air inlet leg 201 has a base 207 and inlet orifice. Above the inlet orifice at the bottom of dip tube 241 is a valve ball 249. (The ball valve or an alternative flap valve may be located in either the leg or the bottom of the dip tube without exceeding the scope of the present invention.) Air inlet leg 201 is mounted on dip tube 241 so that it is rotatable thereon, and is mounted on hub 209. There is a counterweight 205 that extends off leg 201 that is contained in opposing leg 203. Thus, when the container 200 is tilted, gravity causes counterweight 205 to drop downward in the liquid 270 and this drives the air inlet orifice 201 upwardly to the air pocket rather than to possibly remain submerged. This helps to prevent inadvertent over dispensing of liquid.

Valve ball 249 rests on the inside of hub 209 and closes the bottom of the dip tube 241 as shown, when the container 200 is upright. While upright, the container is squeezed by a user and liquid will flow into the inlet leg 201, past the ball 249 and into the dip tube 241 and the trap chamber 231 until it fills the trap chamber or until the user reaches a predetermined level. The trap chamber may be transparent or translucent, and level marks, discussed above, may be included. Stops, such as a spider screen would stop ball 249 from blocking upwardly when container 200 is squeezed.

Figure 3:
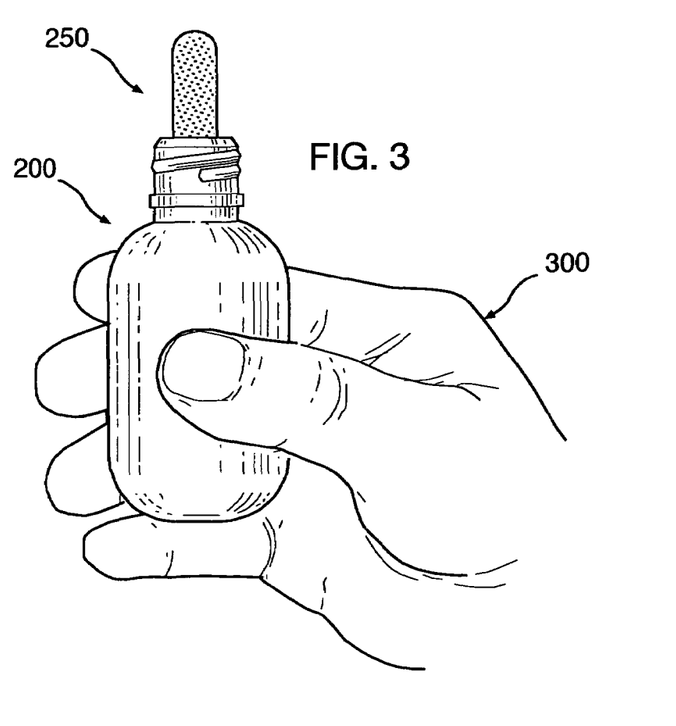
FIGS. 3 and 4 show the present invention device of FIG. 2 in use and FIG. 5 shows a cut profile of the same device as shown in the FIG. 4 tilted position.

Reviewing the operating steps:

The user would squeeze container 200 in its upright position to fill the trap chamber 231 and dip tube 241 with a dose of liquid 270. FIG. 3 shows user 300 performing this step.

Figure 4:
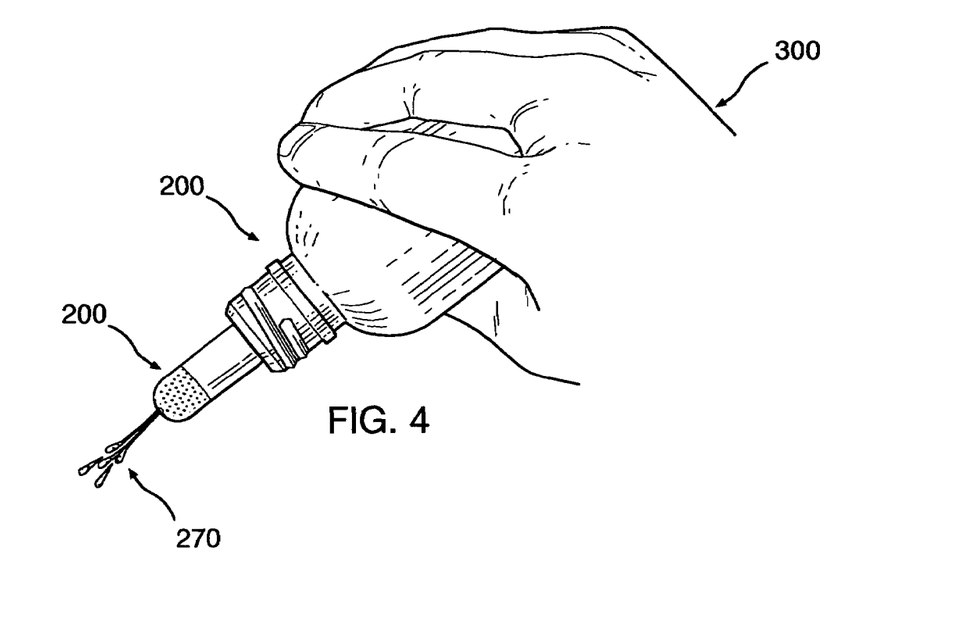

Next, the user would simply invert, wherein the counterweight maintains the air inlet leg 201 upwardly in an air pocket. The use would simply squeeze again to force air into the dip tube and chamber to dispense the dose. FIG. 4 shows user 300 performing this step.

Figure 5:
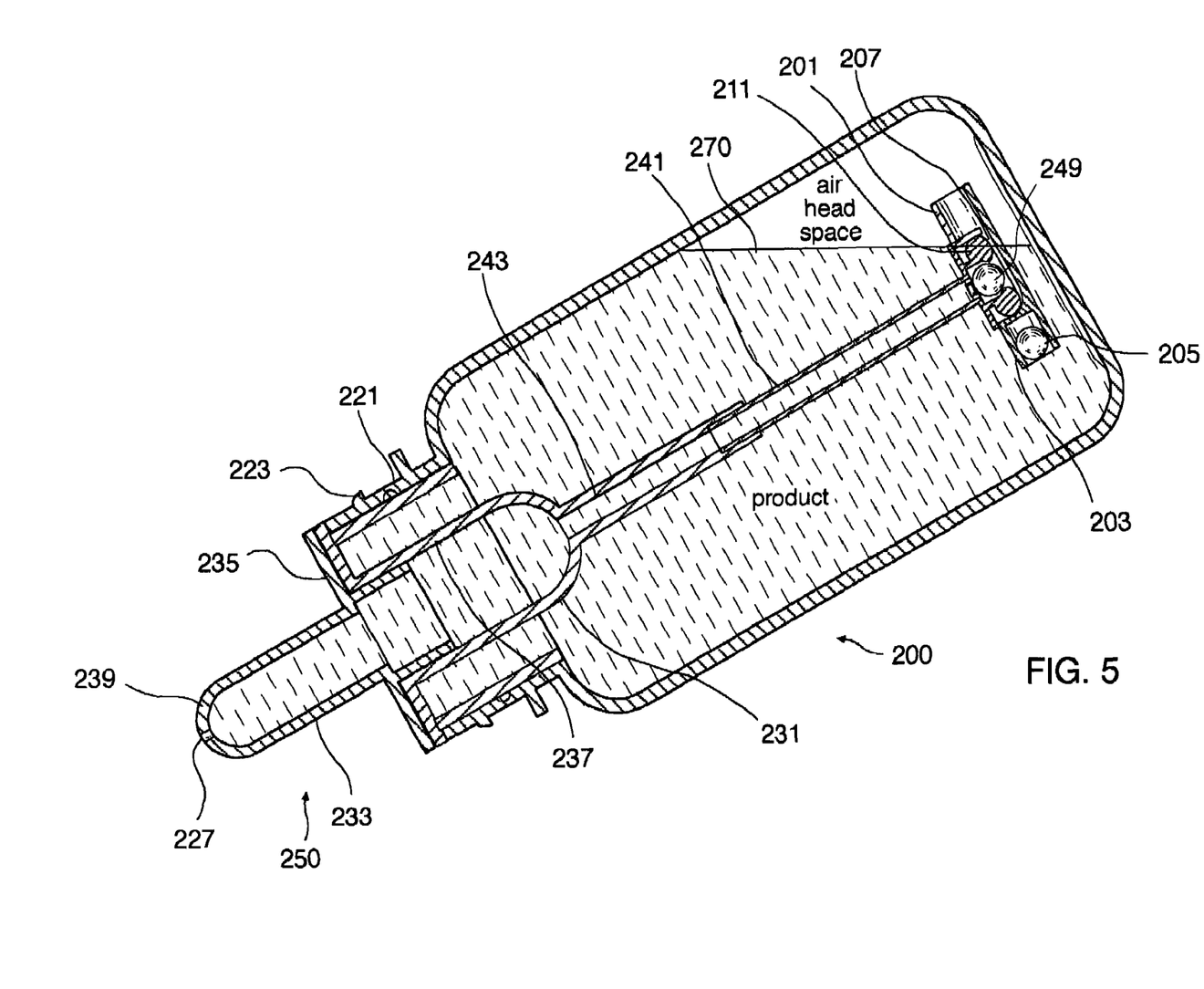

FIG. 5 shows a cut version of the FIGS. 2 through 4 present invention wherein the position of the air inlet leg 201 and counterweight 205 clearly enable air intake for dispensing and avoid excess liquid intake.

Figure 6:
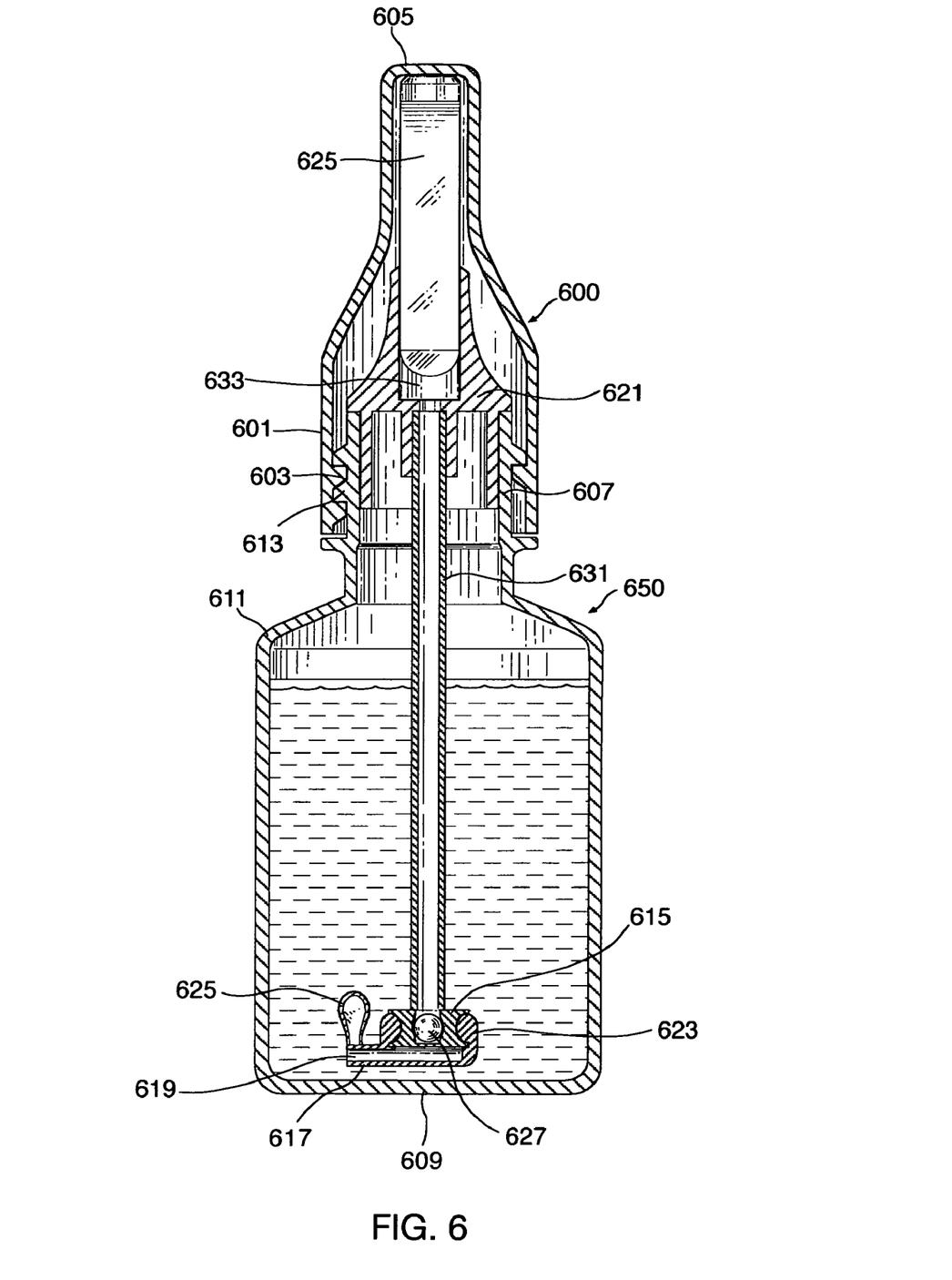
FIG. 6 shows a side cut view of another embodiment of a liquid metered dispensing squeeze bottle of the present invention with a brush and with afloat-type leg drive mechanism.

FIG. 6 shows another embodiment of a present invention device. In this FIG. 6, present invention insertion device 600 with overcap 601 is connected to container 650, as shown. The component functionalities are the same as described above and hence, these components will simply be named here. These include trap chamber 621 with open area 633, dip tube 631 and a valving system at the end of the dip tube 631, along with an air inlet leg 617. Dip tube hub 615 houses ball 627 and holds ring 623 of leg 617 so that it freely rotates thereon. Float 625 is connected to leg 617 near inlet orifice 619, as shown. It is biased as shown so that leg 617 will be very close to container bottom 609 for maximum liquid dispensing. When container 600 is tilted or positioned horizontally, float 625 rises to the top of the liquid to position the orifice 619 in an air pocket for second squeeze air intake into the dip tube 631 and the trap chamber 621 for dispensing the liquid therein onto brush 625.

Brush 625 is connected to and partially located in and extending upwardly from trap chamber 621, as shown. It functions as an applicator for dispensed liquid.

Obviously, numerous modifications and variations of the present invention are possible in light of the above teachings. For example, while the dispensing orifices in some embodiments are small enough to prevent dripping of a liquid via gravity when inserted, but large enough to dispense liquid when the container is squeezed, in other versions, there may be one or more dispensing orifices that are larger and could leak without squeezing, but could have an appropriate sealing overcap. As another example of an alternative, the one way valve system could be imperfect and could slow flow back so that if a user overfilled, slow drain would enable recovery to the desired dosage without wasting content. On the other hand, a full trap chamber could equal exact dosage and the need for drainage back would obviated. It is, therefore, understood that within the scope of the appended claims, the invention may be practiced otherwise than as specifically described herein.

What is claimed is:

1. A liquid metered dispensing bottle, comprising:
    (a.) a squeezable container having an opening for dispensing liquid therefrom at one end and a bottom at the other end;
    (b.) a nonflexible trap chamber of a predetermined volume, connected to said opening of said container, said trap chamber having a lower end which is inserted into said container opening and having an inlet orifice extending from said lower end and into said container, said trap having an upper end with at least one dispensing orifice;
    (c.) a dip tube, said dip tube having an upper end extending from said inlet orifice and extending downwardly into said container, said dip tube having a lower end at or near the bottom of said container; and,
    (d.) a one way valve system connected to said lower end of said dip tube which permits liquid to flow from the container into said dip tube but not from said dip tube to said container, said one way valve system including a valve housing having at least one rotatable leg extending outwardly from said dip tube, said at least one rotatable leg being rotatable relative to said dip tube;
    and wherein said at least one rotatable leg includes a drive mechanism so as to rotate said at least one leg of said dip tube in an upward direction away from liquid content of said container when said container has liquid content and is tilted for dispensing.

2. The liquid metered dispensing bottle of claim 1 wherein said trap chamber has indicia which indicate predetermined volume levels.

3. The liquid metered dispensing bottle of claim 1 wherein said nonflexible trap chamber has either the male or female portion of a snap-in lock for permanent insertion into the opening of said container and said container has the other of the male or female portion of said snap-in lock.

4. The liquid metered dispensing bottle of claim 1 wherein said squeezable container contains a liquid for dispensing which fills the container to a predetermined level below said trap chamber to create an air space therebetween.

5. The liquid metered dispensing bottle of claim 1 wherein said one way valve system includes a ball valve with a ball stop contained within a tapered valve housing having an inlet orifice at its lowest area, and said ball stop is positioned to prevent the ball from contacting and blocking said dip tube from receiving air when said squeezable container is inverted and squeezed.

6. The liquid metered dispensing bottle of claim 1 wherein said drive mechanism is selected from the group consisting of a float mechanism, a counterweight mechanism and combinations thereof.

7. The liquid metered dispensing bottle of claim 1 wherein said dispensing orifice has a diameter small enough to prevent dripping of a liquid therefrom by gravity when inverted but being large enough to dispense liquid therefrom when said container is inverted and squeezed the diameter of the orifice being dictated by the viscosity of the liquid.

8. The liquid metered dispensing bottle of claim 1 wherein said one way valve system includes a two legged valve housing with two opposing legs with sidewalls, one leg having an inlet orifice and the other having a counterweight.

9. The liquid metered dispensing bottle of claim 8 wherein said trap chamber has indicia which indicate predetermined volume levels.

10. The liquid metered dispensing bottle of claim 8 wherein said drive mechanism is selected from the group consisting of a float mechanism, a counterweight mechanism and combinations thereof.

11. The liquid metered dispensing bottle of claim 8 wherein said nonflexible trap chamber has either the male or female portion of a snap-in lock for permanent insertion into the opening of said container and said container has the other of the male or female portion of said snap-in lock.

12. The liquid metered dispensing bottle of claim 8 wherein said squeezable container contains a liquid for dispensing which fills the container to a predetermined level below said trap chamber to create an air space therebetween.

13. The liquid metered dispensing bottle of claim 8 wherein two slide valves are located on opposite ends of a single valve component.

14. The liquid metered dispensing bottle of claim 1 wherein said one way valve system includes at least a one way valve that allows liquid to flow into said dip tube bottom and not out of said dip tube bottom, said one way valve being selected from the group consisting of a ball valve and a flap valve.

15. The liquid metered dispensing bottle of claim 14 wherein said drive mechanism is selected from the group consisting of a float mechanism, a counterweight mechanism and combinations thereof 16. The liquid metered dispensing bottle of claim 14 wherein said bottle further includes flexion means located on at least one of said dip tube and said leg, wherein said flexion means is at least one flexion means selected from the group consisting of a hinging mechanism at a connection of said valve housing to said dip tube, an at least partially flexible dip tube, an at least partially flexible valve housing, a bellows type flexible fold on said dip tube, and a bellows type fold on said valve housing.

17. The liquid metered dispensing bottle of claim 14 wherein said squeezable container contains a liquid for dispensing which fills the container to a predetermined level below said trap chamber to create an air space therebetween.

18. The liquid metered dispensing bottle of claim 1 wherein said trap chamber upper end includes an applicator brush connected thereto proximate said dispensing orifice.

19. The liquid metered dispensing bottle of claim 8 wherein said trap chamber upper end includes an applicator brush connected thereto proximate said dispensing orifice.

20. The liquid metered dispensing bottle of claim 14 wherein said trap chamber upper end includes an applicator brush connected thereto proximate said dispensing orifice.

\* \* \* \* \*